UNITED STATES PATENT OFFICE.

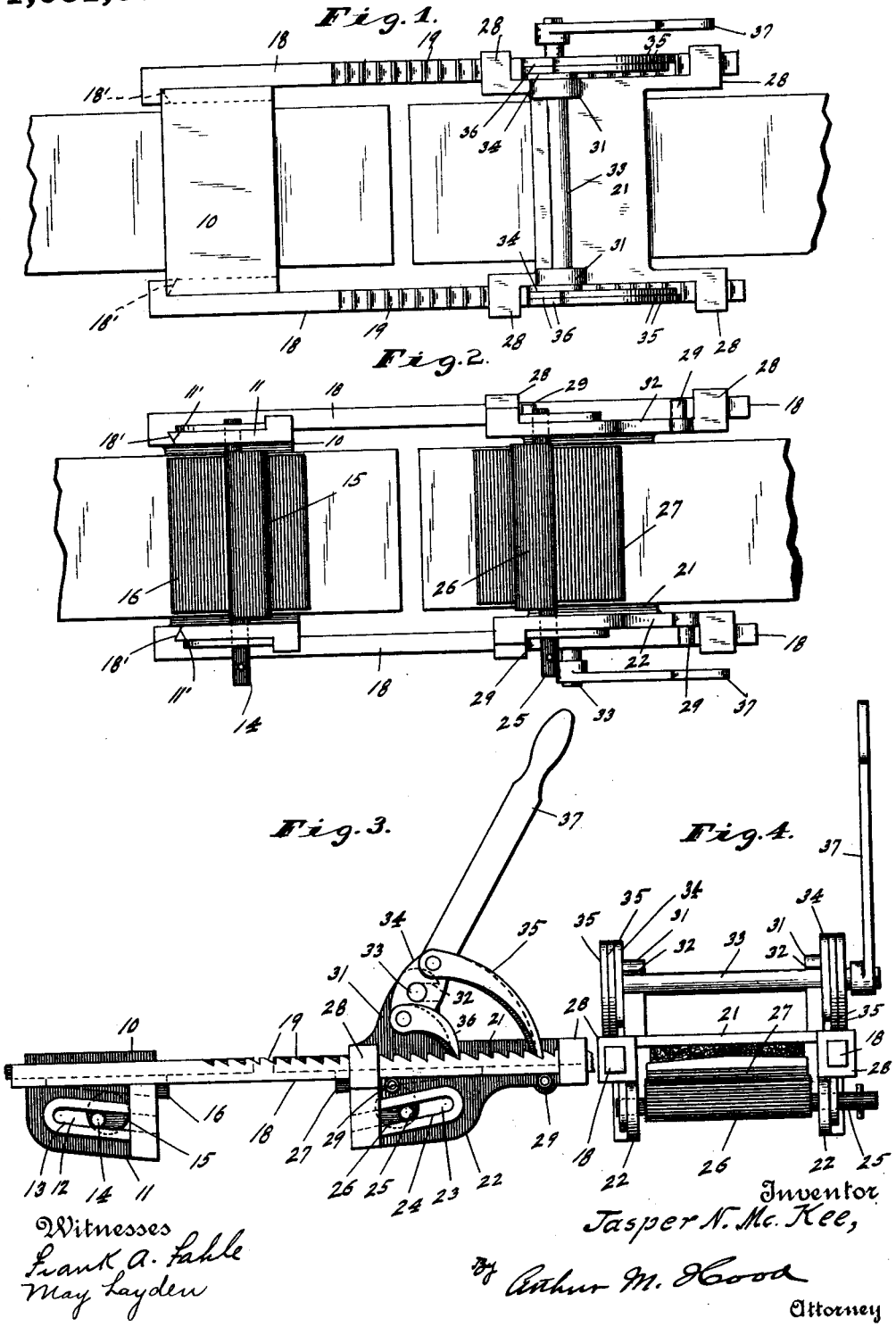

JASPER N. McKEE, OF INDIANAPOLIS, INDIANA, ASSIGNOR TO FRED A. McKEE, OF INDIANAPOLIS, INDIANA.

BELT-STRETCHER.

1,031,357.   Specification of Letters Patent.   Patented July 2, 1912.

Application filed June 29, 1911. Serial No. 636,120.

*To all whom it may concern:*

Be it known that I, JASPER N. McKEE, a citizen of the United States, residing at Indianapolis, in the county of Marion and State of Indiana, have invented a new and useful Belt-Stretcher, of which the following is a specification.

The object of my invention is to produce an apparatus by means of which belts, more especially heavy belts, may be stretched so that the two ends may be brought together and held while being secured together, the construction being such that the apparatus may be readily applied to and withdrawn from the belt.

The accompanying drawings illustrate my invention.

Figure 1 is a plan of an apparatus embodying my invention; Fig. 2 an under plan; Fig. 3 a side elevation, and Fig. 4 an end elevation with the belt shown in section and somewhat exaggerated.

In the drawings, 10 indicates a clamping head or plate of sufficient width to extend across a belt and having one face formed to engage the belt. This plate carries at each side an ear 11 which is perforated at 12 by a slot runway which is inclined toward the rear end of plate 11 and is preferably provided along its outer face with serrations or teeth 13. Rotatably mounted within the two slots 12 is a shaft 14, the ends of which are preferably serrated or toothed to fit the serrations or teeth 13 and carried by shaft 14 is a cam or eccentric 15 which is also preferably serrated as indicated in Figs. 2 and 4, although this is by no means essential. Arranged between plate 10 and eccentric 15 is a wedge 16. The inclination of slots 12, the eccentricity of eccentric 15, and the variation in thickness of the wedge 16 all act cumulatively in the direction of resistance offered by the belt 17.

Detachably hooked to plate 10 at each side are two parallel ratchet bars 18, 18, which extend for any desired length and are provided with suitable ratchet teeth 19. The ratchet bars 18 might be made integral with the clamping head 10 but I prefer to provide each one with a hook 18' which may hook behind the slightly beveled rear edge 11' of each ear 11, as clearly shown in Figs. 1 and 2, so that the device may be readily and compactly arranged for transportation.
A clamping plate or head 21, somewhat similar to head 10, is provided with depending ears 22 similar to ears 11, the said ears having slots 23 serrated at 24 and receiving a serrated shaft 25 carrying an eccentric 26 which coöperates with a wedge 27, these parts being carried by the head 10. Head 21 is provided with projecting perforated ears 28 through which the ratchet bars 18 may slide freely and antifriction rollers 29 are provided to facilitate the movement of the ratchet bars through the ears. Carried by head 21 are two lugs 31, 31 which are provided near their upper ends with open slot bearings 32 (shown in dotted lines in Fig. 3) adapted to receive a rock shaft 33, and this shaft is provided near each end with a cross head 34 provided with pawls 35 and 36 upon opposite sides of the axis of shaft 33, said pawls being proportioned to engage the teeth 19 of an adjacent ratchet bar and drive the same in one direction so as to draw the two clamping heads 10 and 21 together, upon motion of the shaft 33 in either direction. Secured to shaft 33 is a suitable lever 37 by means of which it may be rocked.

It is desirable that the cams 15 be readily withdrawable in order to facilitate the application of the apparatus to a belt and for that reason the said cams 15 have a length somewhat less than the distance between the ears 11, 11 or 22, 22, as clearly indicated in Fig. 2, the arrangement being such that the cams may be swung in the plane of the coöperating slots 12 or 23 so that one end of the shaft 14 or 25 may be swung out of the slot and the cam thus withdrawn. One end of each of the shafts 14 and 25 is elongated sufficiently to permit it to be engaged and positively turned so as to swing the cam down upon a coöperating wedge and drive the same tightly toward the clamping head. It will be noticed that the arrangement of cam, wedge and coöperating shaft slot is such that the resistance of the belt tends to draw both the cam and wedge more tightly in place. The belt engaging faces of the wedge are cambered, as described, for the reason that the best grade of belting is made from a strip of leather taken from the middle of a hide where the leather is the strongest but in that leather the center, which lay immediately over the back bone of the animal, is thinner than the edges of the belt and by making the wedge as described, a firm hold is secured to the belt so that it is stretched evenly throughout its entire width.

The operation is as follows: Cams 15 and 26 being first removed, the two clamping heads are applied to adjacent ends of the belt, and the cams then swung into place by having their longer shaft ends first projected into the slot of one of the ears and the cam then is swung in the plane of the slot until the short shaft end enters the slot of the opposite ear. When the cam is squared up, a wedge is placed between the cam and the belt and the cam then rotated so as to drive the wedge against the belt, the rotation of the cam at the same time drawing the wedge lengthwise into place. When each of the clamping heads has been firmly attached to its end of the belt, the ratchet bars 18 are threaded through the perforated ears 28 until their hooks 18′ engage the rear edges of the ears 11 of clamping head 10. Thereupon shaft 33 is slipped into the sockets 32 and the two clamping heads brought together with as much force as is desired by reciprocation of the rock shaft 32. By this arrangement the belt ends may be brought squarely together and firmly held while they are connected by any suitable means.

I claim as my invention:

1. A belt tightener comprising a clamping head formed to engage one face of the belt, said head having inclined run-ways, a clamping cam arranged between said run-ways and having its shaft projected into said run-ways, and a wedge arranged between the clamping head and cam.

2. A belt tightener comprising a clamping head formed to engage one face of the belt, said head having inclined run-ways, a clamping cam arranged between said run-ways and having its shaft projected into said run-ways, said cam and its shaft being so proportioned that the cam may be swung in the plane of the run-ways so as to be extracted therefrom, and a wedge arranged between the clamping head and cam.

3. A belt tightener comprising a clamping head formed to engage one face of the belt, said head having inclined run-ways, a clamping cam arranged between said run-ways and having its shaft projected into said run-ways, and a wedge arranged between the clamping head and cam, said wedge having its belt-engaging face cambered.

4. A belt tightener comprising a clamping head formed to engage one face of the belt, said head having inclined run-ways, a clamping cam arranged between said run-ways and having its shaft projected into said run-ways, said cam and its shaft being so proportioned that the cam may be swung in the plane of the run-ways so as to be extracted therefrom, and a wedge arranged between the clamping head and cam, said wedge having its belt-engaging face cambered.

5. A belt tightener comprising a pair of clamping heads, a pair of ratchet bars having a separable hooked connection with one of said heads and extending across the other of said heads, a pair of lugs carried by the other of said heads and each having a slot bearing, a rock shaft transversely removably mounted in said slot bearings, and pawls carried by said rock shaft and engaging the ratchet bars.

6. A belt tightener comprising a pair of clamping heads, a pair of ratchet bars having a connection with one of said heads and extending across the other of said heads, a pair of lugs carried by the other of said heads and each having a slot bearing, a rock shaft transversely removably mounted in said slot bearings, and pawls carried by the said rock shaft and engaging the ratchet bars.

In witness whereof, I, have hereunto set my hand and seal at Indianapolis, Indiana, this 27th day of June, A. D. one thousand nine hundred and eleven.

JASPER N. McKEE. [L. S.]

Witnesses:
 FRANK A. FAHLE,
 MAY LAYDEN.

---

Copies of this patent may be obtained for five cents each, by addressing the "Commissioner of Patents, Washington, D. C."